(12) United States Patent  (10) Patent No.: US 7,733,505 B2
Lundgren  (45) Date of Patent: Jun. 8, 2010

(54) ATTITUDE DETECTION SYSTEM AND METHOD

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 11/691,259

(22) Filed: Mar. 26, 2007

(65) Prior Publication Data

US 2008/0243426 A1  Oct. 2, 2008

(51) Int. Cl.
G01B 11/14  (2006.01)

(52) U.S. Cl. ..................................... 356/614

(58) Field of Classification Search .............. 356/614, 356/607, 609, 622, 639, 640, 629
See application file for complete search history.

(56) References Cited

U.S. PATENT DOCUMENTS

| 4,492,473 | A | * | 1/1985 | Richter et al. ............... 356/640 |
| 4,896,343 | A | * | 1/1990 | Saunders ..................... 378/95 |
| 5,067,817 | A | * | 11/1991 | Glenn ......................... 356/613 |
| 5,102,223 | A | * | 4/1992 | Uesugi et al. ................ 356/607 |
| 5,104,227 | A | * | 4/1992 | Uesugi et al. ................ 356/607 |
| 5,471,326 | A |  | 11/1995 | Hall et al. |
| 5,774,207 | A | * | 6/1998 | Yoshida et al. .............. 356/3.07 |
| 6,075,605 | A | * | 6/2000 | Futamura et al. ............. 356/608 |
| 6,166,808 | A | * | 12/2000 | Greve .......................... 356/601 |
| 6,927,864 | B2 | * | 8/2005 | Clark .......................... 356/630 |
| 6,954,551 | B2 |  | 10/2005 | Weismuller |
| 2006/0132803 | A1 | * | 6/2006 | Clair et al. ................... 356/614 |
| 2006/0158666 | A1 | * | 7/2006 | Schelinski et al. ........... 356/614 |

OTHER PUBLICATIONS

Beraldin, "Integration of Laser Scanning and Close-Range Photogrammetry—The Last Decade and Beyond," XXth International Society for Photogrammetry and Remote Sensing (ISPRS) Congress, Commission VII, pp. 972-983, 2004.
Howard et al., "Quadrature Sampling Phase Detection," Rev. Sci. Instrum., 65, (6), pp. 2130-2133, 1994.

* cited by examiner

Primary Examiner—Tarifur R. Chowdhury
Assistant Examiner—Isiaka O Akanbi
(74) Attorney, Agent, or Firm—Klintworth & Rozenblat IP LLC

(57) ABSTRACT

Systems and methods for real-time determination of an angle and range to a surface are provided. In one embodiment, such a system may include a transmitter for producing an output beam, a scanner for redirecting the output beam into a scan pattern towards a surface, a receiver for receiving a beam scattered from the surface, and a processor adapted to receive continuous tangential angle data from the scanner, and range data from the receiver, in order to determine a real-time angle and range to the surface.

24 Claims, 6 Drawing Sheets

ATTITUDE DETECTION SYSTEM AND METHOD

BACKGROUND OF THE INVENTION

A variety of systems and methods exist today for the real-time determination of the attitude of a surface, such as for the determination of the angle and range from a host vehicle to a flat docking, berthing vehicle, or other type of structure, or for varying types of applications. Many of these systems and methods utilize complex targets, lasers, imaging systems with lots of computer power, and/or other types of devices. This may lead to an increased number of parts, unreliability, efficiency problems, extensive time constraints, accuracy problems, excessive space requirements, increased weight, excessive power requirements, high costs, and/or one or more other types of problems.

A system and/or method for the real-time determination of the attitude of a surface is needed to decrease one or more problems associated with one or more of the existing systems and/or methods.

SUMMARY OF THE INVENTION

In one aspect of the invention, a system for real-time determination of an angle and range to a surface is provided. The system comprises a transmitter for producing an output beam, a scanner for redirecting an output beam produced by the transmitter into a scan pattern towards a surface, a receiver adapted to receive a portion of a beam that is scattered from a surface, and a processor adapted to determine a real-time angle and range to a surface. The scanner is adapted to continuously output tangential angle data regarding a redirected output beam. The receiver is adapted to output range data regarding a received beam. The processor is adapted to receive continuous tangential angle data from the scanner, and to receive range data from the receiver.

In another aspect of the invention, a method for real-time determination of an angle and range to a surface is provided. The method comprises: transmitting an output beam; continuously redirecting the transmitted output beam into a scanning beam pattern towards the surface; continuously generating tangential beam angle data for the scanning beam pattern; scattering the scanning beam pattern off the surface; receiving the scattered beam pattern; outputting range data regarding the received scattered beam pattern; and determining a real-time angle and range to the surface.

In a further aspect of the invention, a surface is provided having a determined real-time angle and range. The real-time angle of and range to the surface was determined by: transmitting an output beam; continuously redirecting the transmitted output beam into a scanning beam pattern towards the surface; continuously generating tangential beam angle data for the scanning beam pattern; scattering the scanning beam pattern off the surface; receiving the scattered beam pattern; outputting range data regarding the received scattered beam pattern; and determining the real-time angle of and range to the surface based on a phase difference between the scanning beam pattern and the received scattered beam pattern, which is based on a continuous series of range measurements over time.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
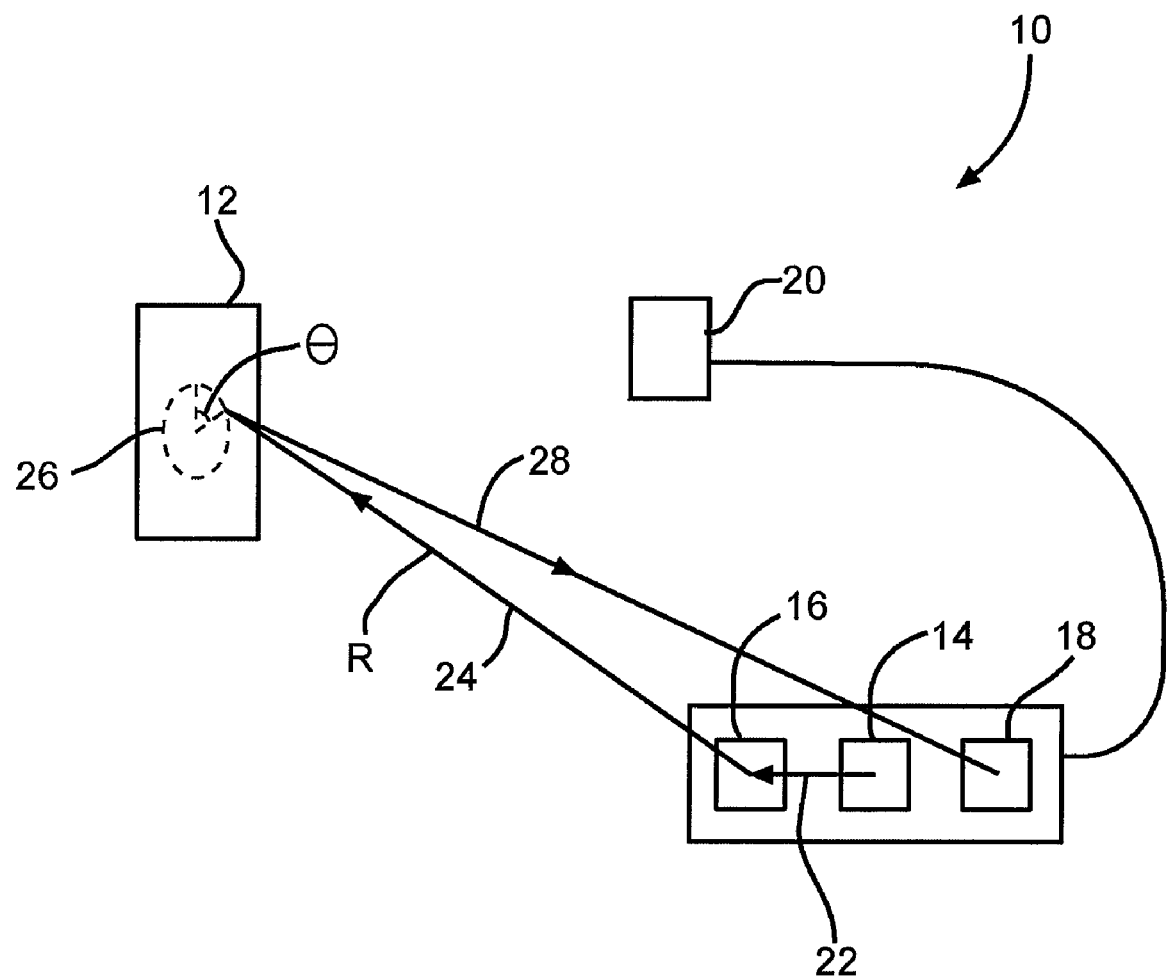
FIG. 1 shows a front-view of one embodiment of an attitude detection system.

FIG. 1 depicts one embodiment of a system 10 which may be used for real-time determination of an angle and range (distance) to a surface 12, such as a vehicle surface, a space vehicle surface, a ground surface, a docking surface, a landing surface, or other type of surface. In one embodiment, the system 10 may be used to determine the angle and range between a space vehicle and another space vehicle, a docking station, a landing station, or to other type of structure. The system 10 may be located on a vehicle, such as on a space vehicle, or on another type of device, and the angle and range to surface 12 may be measured from the location of system 10. In other embodiments, the system 10 may be used in non-space applications, the system 10 may be located in varying locations and/or on varying devices and/or structures, and/or the angle and range to surface 10 may be measured relative to varying devices and/or structures.

The system may comprise a transmitter 14, a scanner 16, a receiver 18, and a processor 20. The transmitter 14 may produce an output beam 22. The output beam 22 may be a laser beam, a light beam, a radar beam, a sonar beam, or other type of beam. The scanner 16 may redirect the output beam 22, produced by the transmitter 14, into a redirected output beam 24 towards the surface 12. The scanner 16 may comprise a reflective scanner using a scan frame, a rotating mirror, or other device, a rotating grating, such as a grating, wedge, or mirror, an electronic grating, or other type of scanner.

Figure 2:
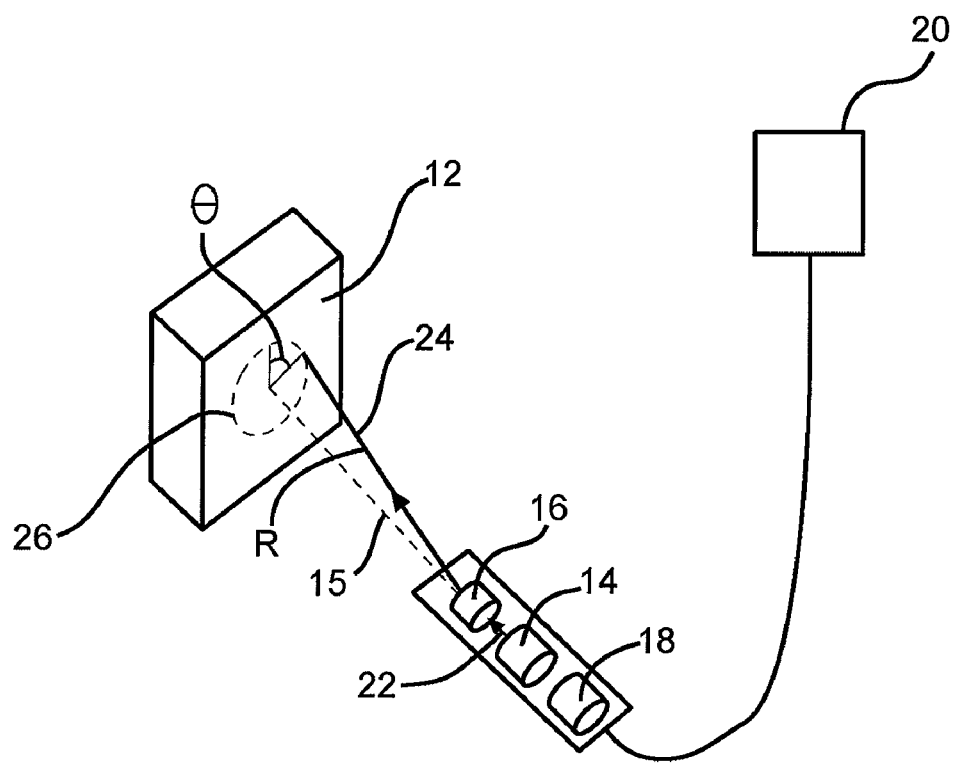
FIG. 2 shows a perspective-view of another embodiment of a surface located perpendicularly relative to a scanner which is redirecting a beam towards the surface.
Figure 2A:
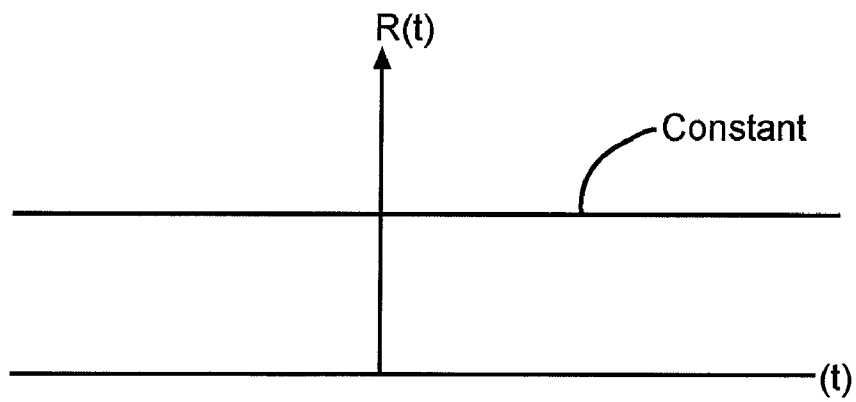
FIG. 2A depicts a graph showing the range of the surface of FIG. 2 over time with respect to the scanner.

FIG. 2 depicts a surface 12 being located perpendicular relative to a longitudinal axis 15 of scanner 16. As shown in FIG. 2, the redirected output beam 24 may be redirected towards the surface 12 in a scan pattern 26 comprising a circular pattern. In other embodiments, the scan pattern 26 may comprise an elliptical pattern, another type of continuous pattern, or other shaped pattern. The scanner 16 may continuously output data, regarding the tangential angle θ of the redirected output beam 24, to the processor 20. As shown in FIG. 2, the tangential angle θ of the redirected output beam 24 is the angle θ, at that particular point in time, where the beam 24 is on the scan pattern 26 with respect to the longitudinal axis (or centerline) 15 of the scanner 16 (in other words, what o'clock the beam 24 is at, during that point in time, around the scan pattern 26). As shown in FIG. 2A, when the surface 12 is located perpendicularly relative to the longitudinal axis 15 of scanner 16, as depicted in FIG. 2, the range R, which may comprise the distance between the scanner 12 and the surface 12, may remain constant over time t irrespective of the position (or angle) of the scanner 16.

Figure 3:
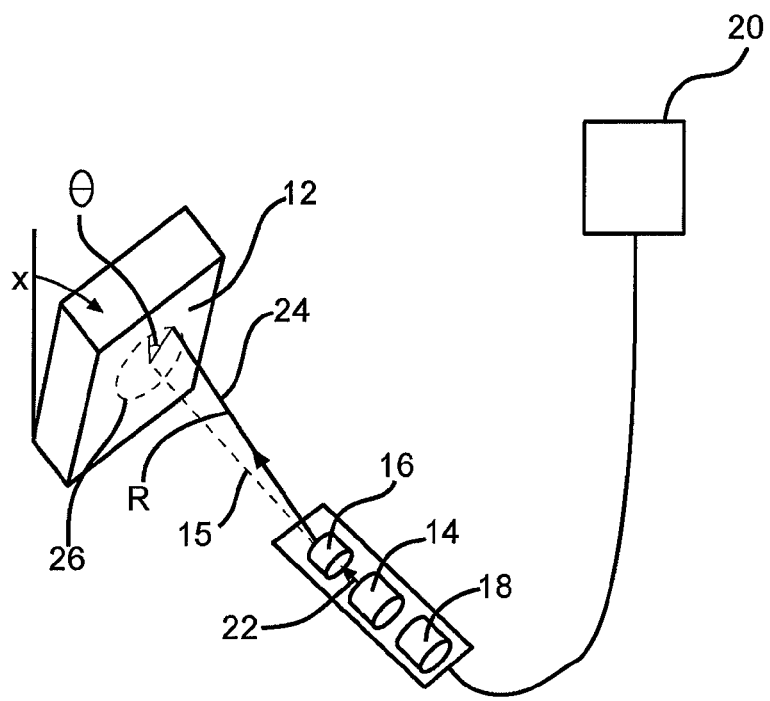
FIG. 3 shows a perspective-view of another embodiment of a surface located with a pure x-tilt relative to a scanner which is redirecting a beam towards the surface.
Figure 3A:
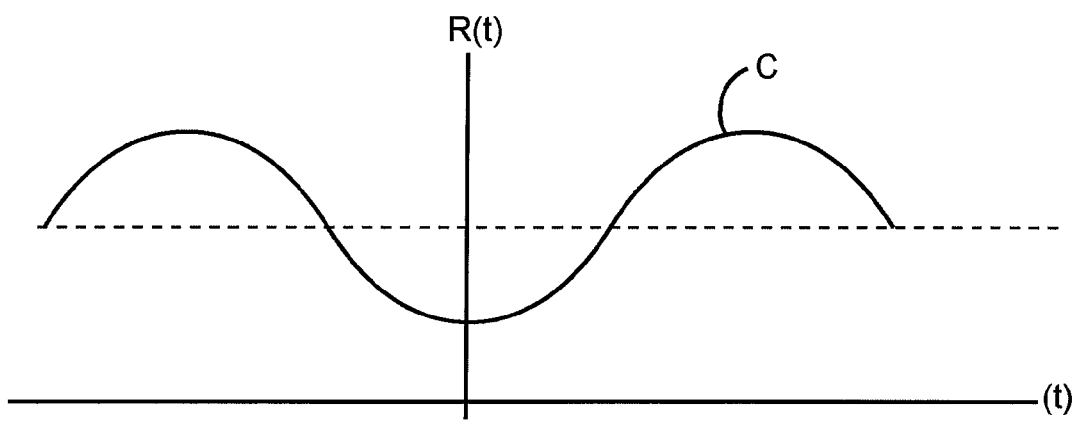
FIG. 3A depicts a graph showing the range of the surface of FIG. 3 over time with respect to the scanner.
Figure 4:
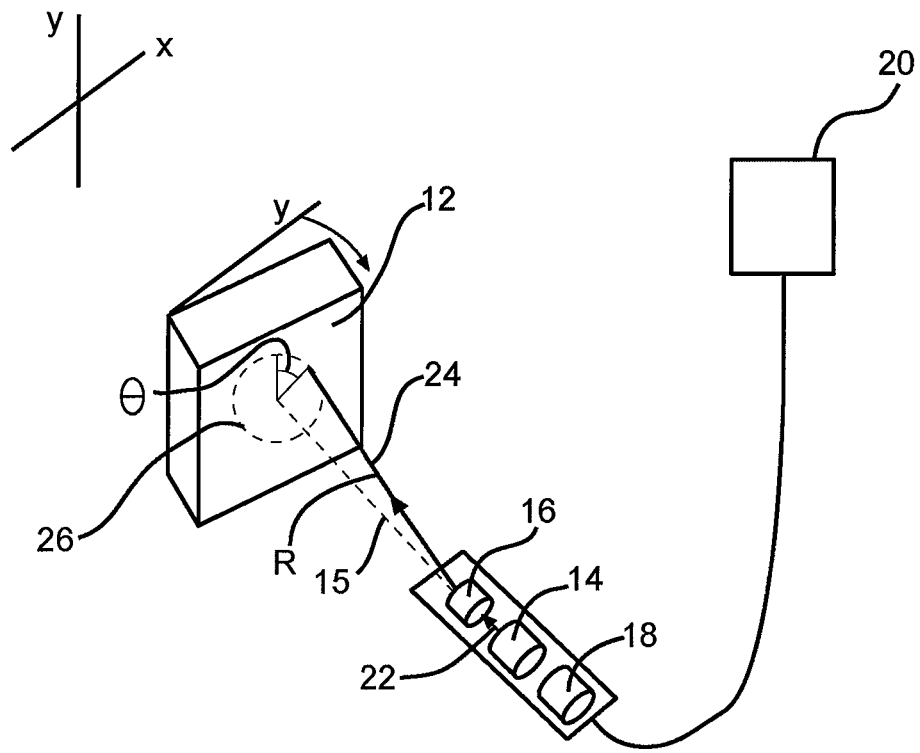
FIG. 4 shows a perspective-view of another embodiment of a surface located with a pure y-tilt relative to a scanner which is redirecting a beam towards the surface.
Figure 4A:
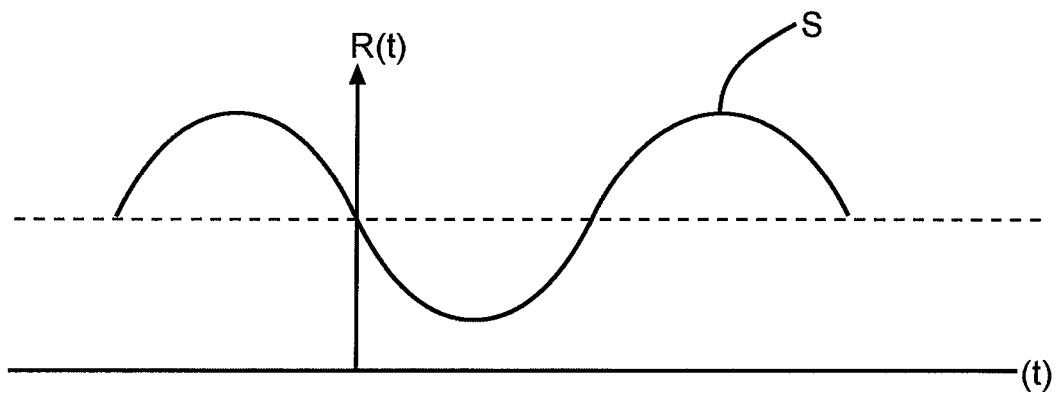
FIG. 4A depicts a graph showing the range of the surface of FIG. 4 over time with respect to the scanner.
Figure 5:
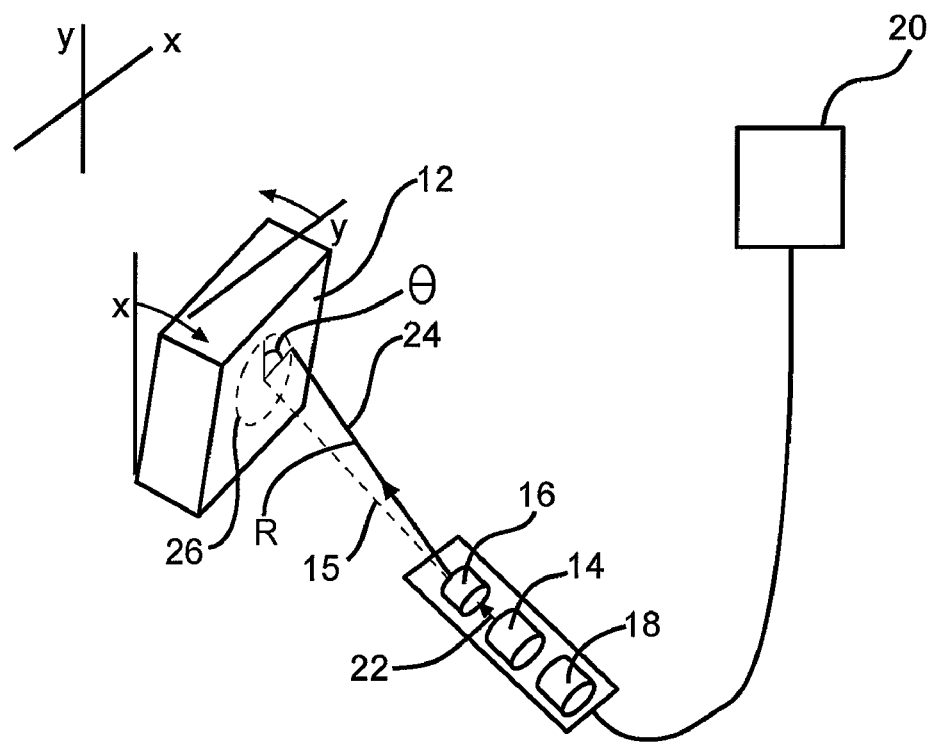
FIG. 5 shows a perspective-view of another embodiment of a surface located with both a x and y tilt relative to a scanner which is redirecting a beam towards the surface.
Figure 5A:
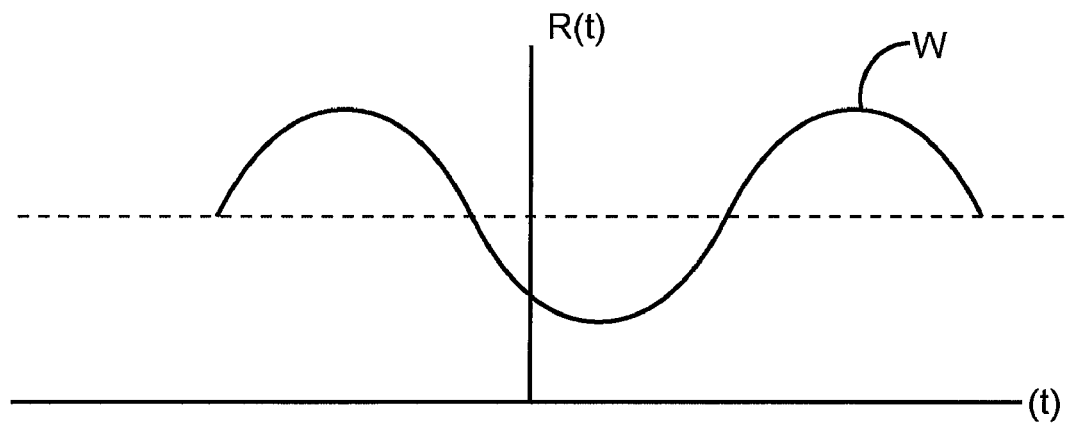
FIG. 5A depicts a graph showing the range of the surface of FIG. 5 over time with respect to the scanner.

FIG. 3 depicts the surface 12 being located with a pure x-tilt relative to the longitudinal axis 15 of scanner 16. As shown in FIG. 3A, when the surface 12 is located with a pure x-tilt relative to scanner 16, as depicted in FIG. 3, the measured range R, plotted as a function of time t, may fluctuate in a cosine wave C over time t with the cosine wave's magnitude (or amplitude) corresponding to the degree of tilt of surface 12. The continuous returning range measurement data over time, R(t), may be treated as a signal such as a wave, and therefore, signal processing techniques may be used to efficiently process the data. FIG. 4 depicts the surface 12 being located with a pure y-tilt relative to scanner 16. As shown in FIG. 4A, when the surface 12 is located with a pure y-tilt relative to scanner 16, as depicted in FIG. 4, the measured range R, plotted as a function of time t, may fluctuate in a sine wave S over time t with the sine wave's magnitude (or amplitude) corresponding to the degree of tilt of surface 12. FIG. 5 depicts the surface 12 being located with both a x and y tilt relative to scanner 16. As shown in FIG. 5A, when the surface 12 is located with both a x and y tilt relative to the longitudinal axis 15 of scanner 16, as depicted in FIG. 5, the range R may fluctuate in a wave W over time t with the angle of tilt of the surface 12 being determinable based on the phase of the wave W, the magnitude of tilt of surface 12 being determinable based on the amplitude of the wave W, and the average distance to surface 12 being determinable based on the average amplitude of the wave W.

As shown in FIG. 1, the redirected output beam 24 may scatter off the surface 12 into scattered, redirected output beam 28 which may be received by receiver 18. In one embodiment, the redirected output beam 24 may return through the scanner 16 to the receiver 18, but in other embodiments, may not return through the scanner 16. The receiver 18 may output range data and/or phase data (e.g., range already processed, time of flight, shift in phase of the returning beam or a carrier on it) regarding the received beam 28 to the processor 20. The processor 20 may comprise at least one of a scan-phase determination circuit, an analog-based processor, a FPGA-based processor, or other type of processor. The processor 20 may determine a real-time angle and range to surface 12 by using the tangential angle data continuously received from the scanner 16, and the range data and/or phase data received from the receiver 18. The processor 20 may determine the real-time angle and range to surface 12 by treating the redirected output beam 24 and the received beam 28 as waveforms, and comparing the phase and/or amplitude differences between the redirected output beam 24 and the received beam 28, based on a continuous series of range measurements over time. The processor 20 may be adapted to utilize data regarding the tilt direction of surface 12, the tilt magnitude of surface 12, the average range of surface 12, and/or other data regarding surface 12, in order to determine the real-time angle and range to surface 12.

Figure 6:
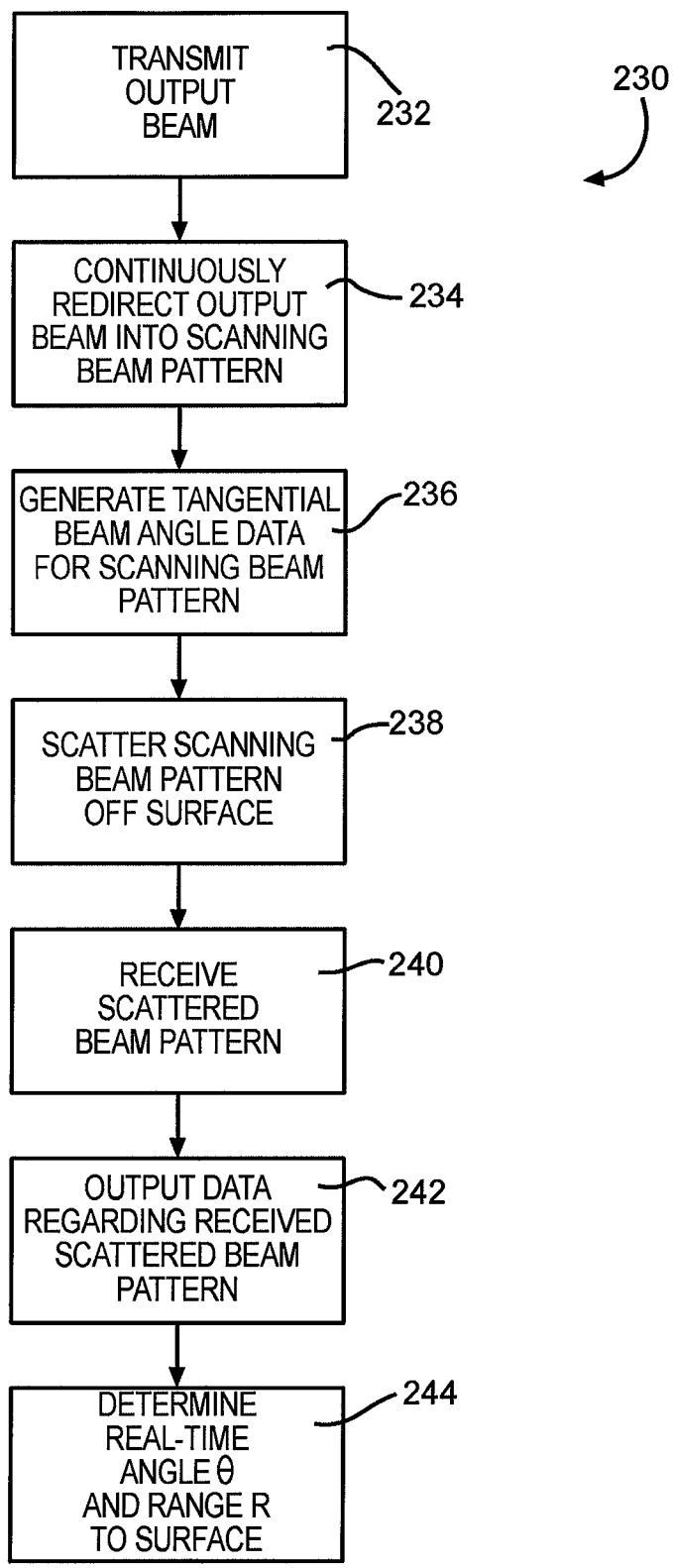
FIG. 6 is a flowchart depicting another embodiment of a method for real-time determination of an angle and range to a surface.

FIG. 6 shows a flow-chart of one embodiment 230 of a method for real-time determination of the attitude of surface 12, relative to the scanner axis 15, and the determination of range R to a surface 12. In one step 232, an output beam 22 may be transmitted. This may be achieved utilizing a transmitter 14 as detailed above. In another step 234, the transmitted output beam 22 may be continuously redirected into a scanning beam pattern 26, which may comprise a circle, towards the surface 12. This may be done utilizing a scanner 16 as previously detailed. In another embodiment, the scanning beam pattern 26 may comprise a pattern other than a circle (i.e., two variables including a radial angle and a tangential angle) in order to provide more data across the target surface 12. In still another step 236, tangential beam angle data may be continuously generated for the scanning beam pattern 26. This data may be provided to a processor 20 as detailed above. In yet another step 238, the scanning beam pattern 26 may be scattered off the surface 12. In an additional step 240, the scattered beam pattern 28 may be received. This may be accomplished by utilizing a receiver 18 as detailed above. In another step 242, range data regarding the received scattered beam pattern 28 may be outputted. The outputted data may be provided to a processor 20 as previously detailed. In another embodiment, phase data regarding the received scattered beam pattern 28 may also be outputted. In still another step 244, a real-time angle α and range R to the surface 12 may be determined. The real-time angle α of the surface 12 is defined as a vector which is the difference between a normal (perpendicular line though) of surface 12 and the scanner longitudinal axis 15. Any of the systems and methods disclosed herein may be utilized to make this determination.

For instance, the determination of step 244 may include any of the following: determining a phase difference between the redirected output beam 24 and the received scattered beam pattern 28; utilizing a processor 20 comprising a scan-phase determination circuit, an analog-based processor, or an FPGA-based processor; determining phase and amplitude differences between the redirected output beam 24 and the received scattered beam 28; treating the redirected output beam 24 and the received scattered beam 28 as waveforms and comparing their phase and amplitude differences, based on a continuous series of range measurements over time; and/or utilizing data regarding one or more of the tilt direction of the surface 12, the tilt magnitude of the surface 12, and/or the average range R of the surface 12. In still other embodiments, the determination may include additional systems or methods.

In an additional embodiment, a surface 12 may be provided having a determined real-time angle α and range R. The surface 12 may comprise any of the embodiments detailed above. The real-time angle α and range R of the surface 12 may have been determined by the following steps: transmitting an output beam 22; continuously redirecting the transmitted output beam 22 into a scanning beam pattern 26 towards the surface 12; continuously generating tangential beam angle data for the scanning beam pattern 26; scattering the scanning beam pattern 26 off the surface; receiving the scattered beam pattern 28; outputting range data regarding the received scattered beam pattern 28; and determining the real-time angle α and range R to the surface 12 based on a phase difference between the scanning beam pattern 26 and the received scattered beam pattern 28, based on a continuous series of range measurements over time.

The systems and/or methods disclosed above may reduce one or more problems associated with one or more of the prior art systems and/or methods. For instance, one or more embodiments of the systems and/or methods herein disclosed may reduce complexity, may reduce required parts, may be more reliable, may be more efficient, may be more timely, may be more accurate, may require less room, may reduce weight, may use less power, may be less costly, and/or may reduce one or more other types of problems associated with one or more of the prior art systems and/or methods.

It should be understood, of course, that the foregoing relates to exemplary embodiments of the invention and that modifications may be made without departing from the spirit and scope of the invention as set forth in the following claims.

I claim:

1. A system for real-time determination of an attitude angle of a surface and range to the surface, the system comprising:
   a transmitter for producing an output beam;
   a scanner for continuously redirecting the output beam produced by said transmitter into a scan pattern towards the surface in order to continuously scatter the redirected output beam in the scan pattern off the surface, said scanner for continuously outputting tangential angle data regarding the redirected output beam;
   a receiver for continuously receiving a scattered portion of the scattered redirected output beam that is continuously scattered from the surface, said receiver for continuously outputting range data regarding the received scattered portion of the scattered redirected output beam; and
   a processor for receiving the continuous tangential angle data from said scanner, for receiving the continuous outputted range data from said receiver, and for determining the real-time, continuous, attitude angle of the surface and the continuous, real-time range to the surface by treating a continuous series of range measurements over time as waveforms expressed in range as a function of time, the continuous series of range measurements derived from the redirected output beam and the received scattered portion of the scattered redirected output beam, and by comparing phase and amplitude differences of the waveforms of the redirected output beam and the received scattered portion of the scattered redirected output beam.

2. The system of claim 1 wherein said system is for real-time determination of the attitude angle of the surface and the range to the surface, the surface comprising at least one of a vehicle surface, a space vehicle surface, a ground surface, a docking surface, and a landing surface.

3. The system of claim 1 wherein said scan pattern is at least one of circular, elliptical, and continuous.

4. The system of claim 1 wherein said scanner comprises at least one of a reflective scanner, a rotating grating, and an electronic grating.

5. The system of claim 1 wherein said receiver is for outputting phase data regarding the received scattered portion of the scattered redirected output beam.

6. The system of claim 1 wherein said attitude angle of the surface comprises a vector comprising the difference between a normal of the surface and a longitudinal axis of the scanner.

7. The system of claim 1 wherein said processor comprises at least one of a scan-phase determination circuit, analog-based, and FPGA based.

8. The system of claim 1 wherein said tangential angle data comprises data regarding a tangential angle at continuous points in time showing where the output beam is on the scan pattern with respect to a longitudinal axis of the scanner.

9. The system of claim 1 wherein said range to the surface comprises an average distance of the surface from the system.

10. The system of claim 1 wherein said processor is for receiving phase data from said receiver.

11. The system of claim 1 wherein said processor uses the continuous tangential angle data and the outputted range data, collectively comprising at least one of tilt direction of the surface, tilt magnitude of the surface, and average range of the surface, in order to determine the real-time attitude angle of the surface and the real-time range to the surface.

12. The system of claim 1 wherein the transmitter, the scanner, the receiver, and the processor are located on one vehicle, device, or structure.

13. A method for real-time determination of an attitude angle of a surface and range to the surface, the method comprising:
   transmitting an output beam;
   continuously redirecting said transmitted output beam into a scanning beam pattern towards said surface;
   continuously generating tangential beam angle data for said scanning beam pattern;
   continuously scattering said scanning beam pattern off said surface;
   continuously receiving a scattered portion of said scattered beam pattern;
   continuously outputting range data regarding said received scattered portion of said scattered beam pattern; and
   determining the real-time, continuous, attitude angle of the surface and the Continuous range to said surface by treating a continuous series of range measurements over time as waveforms expressed in range as a function of time, the continuous series of range measurements derived from the redirected output beam and the received scattered portion of the scattered redirected output beam, and by comparing phase and amplitude differences of the waveforms of the redirected output beam and the received scattered portion of the scattered redirected output beam.

14. The method of claim 13 wherein said surface comprises at least one of a vehicle surface, a space vehicle surface, a ground surface, a docking surface, and a landing surface.

15. The method of claim 13 wherein said scanning beam pattern is at least one of circular, elliptical, and continuous.

16. The method of claim 13 wherein said continuously redirecting step utilizes at least one of a reflective scanner, a rotating grating, and an electronic grating.

17. The method of claim 13 further comprising the step of outputting phase data regarding said received scattered portion of said scattered beam pattern.

18. The method of claim 13 wherein said attitude angle of the surface comprises a vector comprising the difference between a normal of the surface and a longitudinal axis of the scanner.

19. The method of claim 13 wherein said determining step utilizes a processor which is at least one of a scan-phase determination circuit, analog based, and FPGA based.

20. The method of claim 13 wherein said tangential beam angle data comprises data regarding a tangential angle at continuous points in time showing where the redirected output beam is on the scanning beam pattern with respect to a longitudinal axis of a scanner.

21. The method of claim 13 wherein said range to the surface comprises an average distance of the surface from a system comprising at least one of a transmitter, a scanner, a receiver, and a processor.

22. The method of claim 13 wherein said determining step utilizes data regarding at least one of tilt direction of the surface, tilt magnitude of the surface, and average range of the surface.

23. The method of claim 13 wherein said method utilizes a transmitter, a scanner, a receiver, and a processor.

24. The method of claim 23 wherein the transmitter, the scanner, the receiver, and the processor are located on one vehicle, device, or structure.

* * * * *